US011593397B2

(12) United States Patent
Krishna et al.

(10) Patent No.: US 11,593,397 B2
(45) Date of Patent: Feb. 28, 2023

(54) LOW LATENCY POLLING (71) Applicant: MICRO FOCUS LLC, Santa Clara, CA (US)

(72) Inventors: Vamsi Krishna, Bangalore (IN); Kalyan Koka, Bangalore (IN); Kamal Maheshwari, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 28 days.

(21) Appl. No.: 17/062,831

(22) Filed: Oct. 5, 2020

(65) Prior Publication Data

US 2022/0107956 A1 Apr. 7, 2022

(51) Int. Cl.
*G06F 16/00* (2019.01)
*G06F 16/27* (2019.01)

(52) U.S. Cl.
CPC .................................. *G06F 16/27* (2019.01)

(58) Field of Classification Search
CPC ........................................................ G06F 16/27
See application file for complete search history.

(56) References Cited

U.S. PATENT DOCUMENTS

| 9,230,000 | B1* | 1/2016 | Hsieh ...................... G06F 16/27 |
| 9,940,347 | B2 | 4/2018 | Gottwald et al. | |
| 10,565,071 | B2 | 2/2020 | Kedia et al. | |
| 2004/0107381 | A1* | 6/2004 | Bomfim ................. G06F 16/22 |
| | | | 714/4.12 |
| 2006/0161585 | A1* | 7/2006 | Clarke ..................... H04L 69/18 |
| | | | 709/227 |
| 2011/0047413 | A1* | 2/2011 | McGill .................... H04L 69/40 |
| | | | 717/172 |
| 2012/0259894 | A1* | 10/2012 | Varley ................. G06F 16/2379 |
| | | | 707/795 |
| 2013/0117229 | A1* | 5/2013 | Jain ......................... G06F 13/22 |
| | | | 707/703 |
| 2014/0149346 | A1* | 5/2014 | Yanovsky ............... G06F 16/27 |
| | | | 707/615 |
| 2019/0102418 | A1 | 4/2019 | Vasudevan et al. | |
| 2019/0236179 | A1* | 8/2019 | Priebe .................. G06F 21/602 |
| 2020/0019474 | A1 | 1/2020 | Yoon et al. | |
| 2020/0110775 | A1* | 4/2020 | Regard ................. G06F 16/906 |

(Continued)

OTHER PUBLICATIONS

Unknown Author; About Change Data Capture (SQL Server); 10 pages; Jan. 14, 2019.

(Continued)

*Primary Examiner* — Alexander Khong
(74) *Attorney, Agent, or Firm* — Sheridan Ross P.C.

(57) ABSTRACT

A poll of a first database is initiated (e.g., a SOT database). The poll of the first database is to identify if any transactions have occurred since a previous poll of the first database. Based on the poll of the first database, information is received that identifies one or more transaction identifiers. A missing transaction identifier is identified based on a contagious list of transaction identifiers. In response to identifying the missing transaction identifier, the missing transaction identifier is stored in a list of missing transaction identifiers for use in a later poll of the first database. By tracking the missing transaction identifier, the process can identify transactions that take longer to commit without introducing lag for transactions that commit quickly.

20 Claims, 3 Drawing Sheets

(56) References Cited

U.S. PATENT DOCUMENTS

2021/0365440 A1* 11/2021 Pople .................. G06F 16/2438
2021/0382877 A1* 12/2021 Li ....................... G06F 16/2471

OTHER PUBLICATIONS

Vincent Van Donselaar; Low Latency Asynchronous Database Synchronization And Data Transformation Using The Replaction Log; University of Twente, Master Thesis; 59 pages; Aug. 14, 2015.
Felix Gessert; Low Latency For Cloud Data Management; University of Hamberg; 340 pages; 2018.
Paul Lane; Oracle Database, Data Warehousing Guide 11g Release (11.1), B28313-02; 584 pages; Sep. 2007.

* cited by examiner

LOW LATENCY POLLING

FIELD

The disclosure relates generally to database synchronization and particularly to polling methods of database synchronization.

BACKGROUND

Modern software stacks are becoming Polyglot Persistence (i.e., they require multiple specialized databases). This is accelerated by variety of trends, such as, an adoption of micro service architectures, a need for data warehousing, a need for actionable analytics, a need to be real time in software operations etc. However, the adoption of Polyglot Persistence has created a common problem—to have a consistent data representation across multiple data stores. In traditional architectures, where the data is stored in a single database (e.g., a Relational Database Management system (RDBMS)), the Atomicity, Consistency, Isolation Durability (also known as ACID) properties of the data storage would have ensured a consistent state of data for application software; however, the same is very difficult to achieve in Polyglot Persistent systems. For this reason, a compromise called Basically Available. Soft state, Eventual consistency (BASE), commonly called "Eventual Consistency" has been more commonly adopted.

In order to achieve eventual consistency of the data, the data in a main database called a "Source of Truth" (SOT) database is tracked for changes and that are to be streamed to downstream databases for synchronization. This is a common technique called Change Data Capture (CDC). CDC is a highly studied aspect of data systems and various solutions have been proposed with a variety of advantages and disadvantages.

One solution is to use an event queue. In this technique, the SOT database maintains a changelog table along with the data table. This changelog table itself is populated through hooks in application code, database triggers, etc. The biggest disadvantage of this technique is the additional space required in the SOT database and the processing power used by SOT database in populating a changelog. In some cases, where the rows in SOT database run into millions, this becomes a significant problem.

Another solution is to use polling. This is a technique where the SOT database is polled for changes using additional metadata columns. The polling thread remembers the state of last synchronization through the use of metadata columns and streams the delta changes to downstream databases. In existing polling techniques, there may be cases where polling cannot identify some changes to the database tables due to race conditions. To avoid the loss of data between polls some solutions have introduced a long lag time to allow committed data to synchronize; however, in many cases, the long lag time is unacceptable.

Log Scanners are another common solution. In this technique, the transaction logs (journals) of the SOT database are parsed and the changes to the databases are retrieved. This technique ensures that no changes are lost, however, it is highly dependent on the ability to understand the transactional log format of the SOT databases. Some transaction logs are very proprietary and version dependent, which can cause the transaction log software to break when a new version is introduced.

SUMMARY

These and other needs are addressed by the various embodiments and configurations of the present disclosure. A poll of a first database is initiated (e.g., a SOT database). The poll of the first database is to identify if any transactions have occurred since a previous poll of the first database. Based on the poll of the first database, information is received that identifies one or more transaction identifiers. A missing transaction identifier is identified based on a contagious list of transaction identifiers. In response to identifying the missing transaction identifier, the missing transaction identifier is stored in a list of missing transaction identifiers for use in a later poll of the first database. By tracking the missing transaction identifier, the process can identify transactions that take longer to commit without introducing lag for transactions that commit quickly.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, Of acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
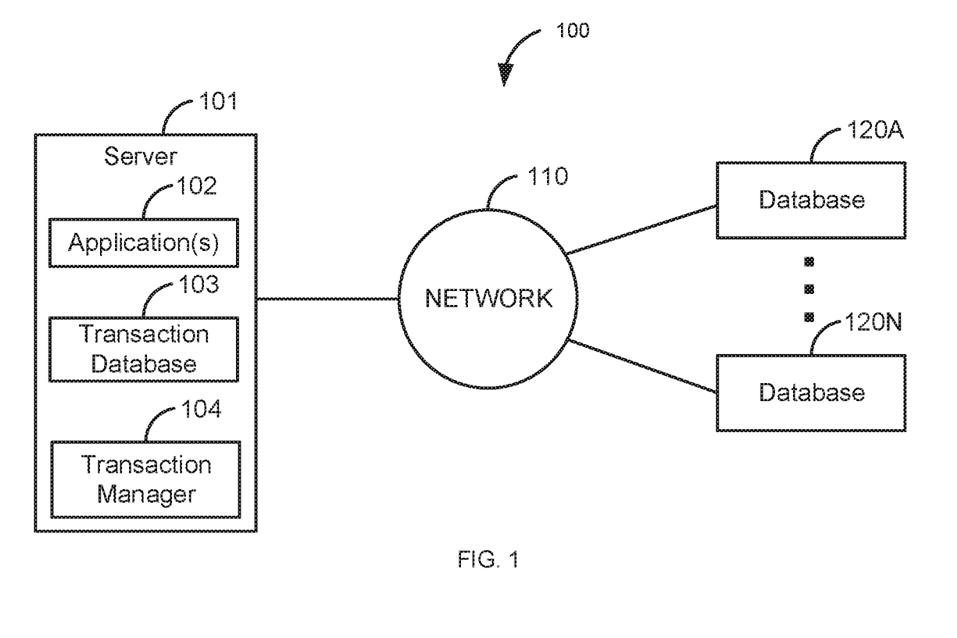
FIG. 1 is a block diagram of a first illustrative system for synchronizing transactions to one or more databases.

FIG. 1 is a block diagram of a first illustrative system 100 for synchronizing transactions to one or more databases 120A-120N. The first illustrative system 100 comprises a server 101, a network 110, and databases 120A-120N.

The server 101 can be any known server, such as, an application server, a web server, a cloud service, a communications server, a security operations server, and/or the like. The server 101 comprises application(s) 102, a transaction database 103, and a transaction manager 104.

The application(s) 102 can be, or may include, any type of application 102 that uses a database 120, such as, a security operations application, a human resource application, a business application, a finance application, a marketing application, an analytics application, a data tracking application, a healthcare application, a data security application, a sales application, an online store application, and/or the like. Although shown in the server 101, the application(s) 102 may reside external to the server 101 or may be distributed between servers 101/devices.

The transaction database 103 can be any type of database that is used to track transactions that are synced to one or more databases 120A-120N. For example, the transaction database 103 may be a SOT database.

The transaction manager 104 is used to synchronize transactions between the application(s) 102 and the databases 120A-120N. The transaction manager 104 uses a novel polling process in order to synchronize data to one or more of the databases 120A-120N as described below in FIGS. 2-3. Although shown in the server 101, the transaction manager 104 may reside external to the server 101 or may be distributed in the network 110. For example, there may be multiple transaction managers 104 on separate servers 101 that synchronize data to the databases 120A-120N.

The network 110 can be, or may include, any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Hyper Text Markup Language (HTML), Representational State Transfer protocol (REST), and/or the like. Thus, the network 110 is an electronic communication network configured to carry messages via packets and/or circuit switched communications.

The databases 120A-120N can be any kind of database, such as a relational database, a Structured Query Language (SQL) database, a PostGRES database, an analytic database (e.g., Micro Focus' Vertica®), a distributed database, an object oriented database, a directory service, a graph database, a hierarchical database, a network database, an Entity Relationship (ER) model database, and/or the like. The databases 120A-120N are shown as being on the network 110. However, the databases 120A-120N may be located on the server 101. The databases 120A-120N may comprise different types of databases 120 or may be similar types of databases 120.

Figure 2:
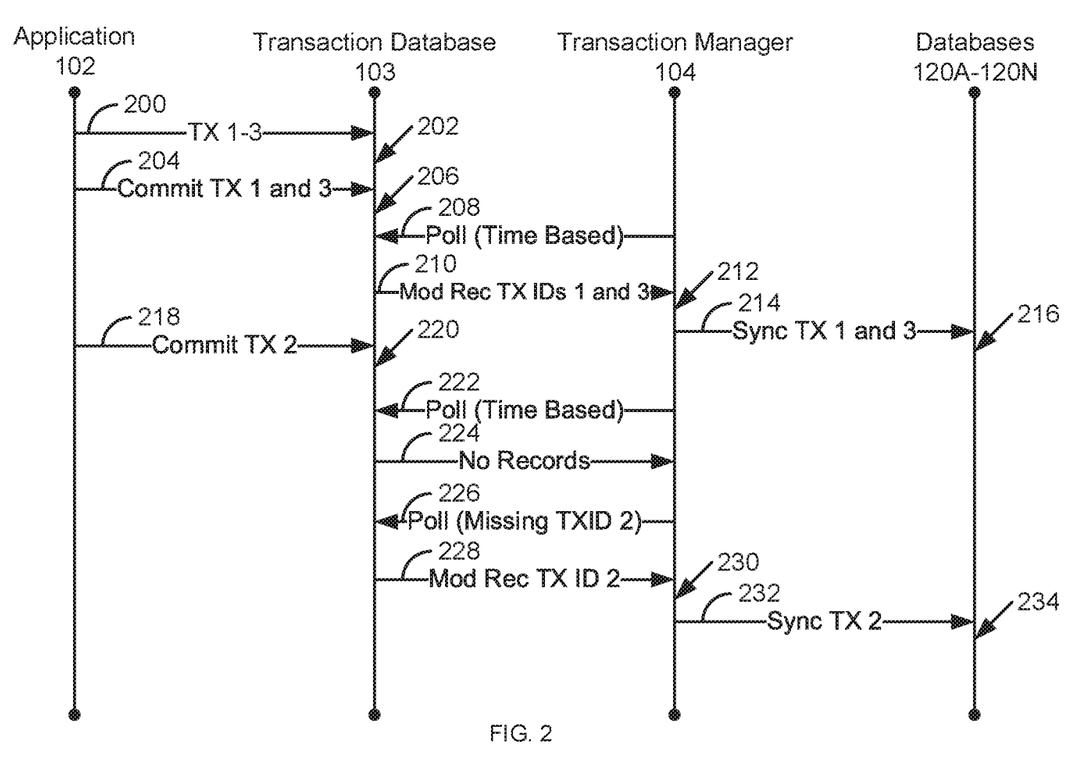
FIG. 2 is a flow diagram of a process for synchronizing transactions to one or more databases.
Figure 3:
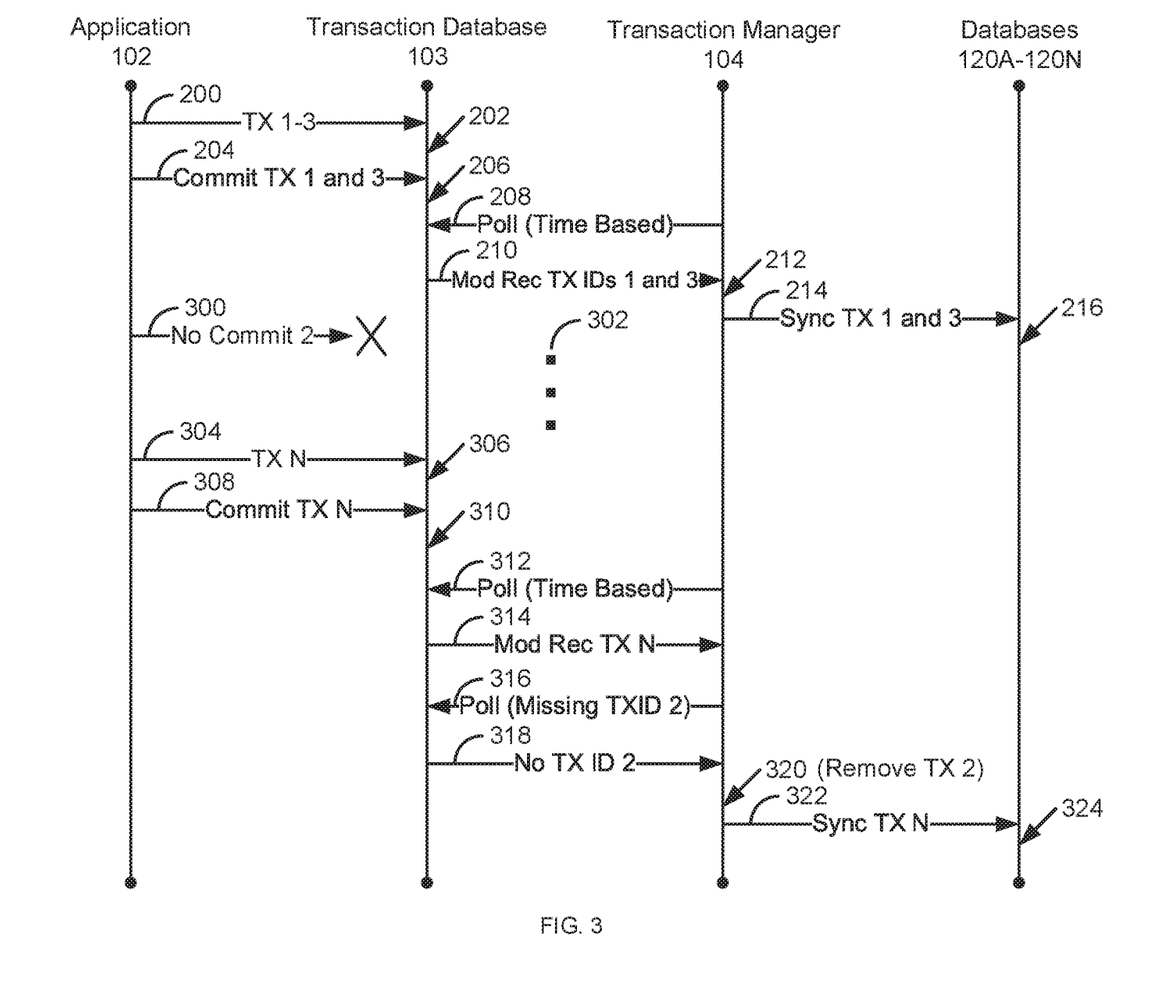
FIG. 3 is a flow diagram of a process for tracking transactions that were received, but not committed.

FIG. 2 is a flow diagram of a process for synchronizing transactions to one or more databases 120A-120N. Illustratively, the server 101, the application(s) 102, the transaction database 103, the transaction manager 104, and the databases 120A-120N are stored-program-controlled entities, such as a computer or microprocessor, which performs the method of FIGS. 2-3 and the processes described herein by executing program instructions stored in a computer readable storage medium, such as a memory (i.e., a computer memory, a hard disk, and/or the like). Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process of FIG. 2 describes an illustrative polling process for synchronizing data between the application(s)

102 and the databases 120A-120N. To give some background on how the process of FIG. 2 works, an illustrative database table is shown below in Table 1. Table 1 is an exemplary illustration of Security Operations database table that manages devices. The DeviceID in column one identifies different devices that are managed. The CVEID in column two is an identifier that identifies common vulnerabilities. The Vulnerability Status of the DVEID is shown in column three. For example, for device D1 there is an associated CVEID (CVE1) that has a vulnerability status of true.

TABLE 1

| DeviceID | CVEID | Vulnerability Status |
|---|---|---|
| D1 | CVE1 | True |
| D2 | CVE1 | False |
| D3 | CVE2 | Not Applicable |
| ... | ... | ... |
| D150000 | CVE5300 | True |

The information in Table is an example of the type of information that gets synchronized to the databases 120A-120N from the application 102 (e.g., a security operations application) by the transaction manager 104. In order for the transaction manager 104 to synchronize data using the polling process, additional columns are added to Table 1 as shown below in Table 2. While not shown for brevity, there may be additional columns that are added based on implementation. For example, a version number of a row may be added to track different versions of rows in the polling process.

TABLE 2

| DeviceID | CVEID | Vulnerability Status | LastModifiedTime | RowID | TXID |
|---|---|---|---|---|---|
| D1 | CVE1 | True | 10:00:01 | 1 | 1 |
| D2 | CVE1 | False | 10:00:03 | 2 | 2 |
| D3 | CVE2 | Not Applicable | 10:00:05 | 3 | 3 |
| ... | ... | ... | ... | ... | ... |
| D150000 | CVE5300 | True | 10:00:58 | 789999999 | 1567900 |

As shown in Table 2, three new columns are added: 1) LastModifiedTime, 2) RowID, and 3) TXID. The LastModifiedTime identifies the last time that particular row was modified. This field is populated by a database trigger of the transaction database 103 whenever a row is modified/updated (i.e., committed) by the application 102. For example, for device D1, the last time the data for device D1 was modified was at 10:00:01 (e.g., when the data was last committed). The RowID is a unique identifier for each row. It is used to track inserted records. The TXID (transaction ID) is a contagious number that is assigned for each new transaction request. For example, if a new transaction request is received, the assigned TXID will be the last TXID incremented by one.

The process of FIG. 2 is an illustrative example of where three transaction requests are received; of the three received transaction requests, two are committed before the poll and one is not committed until after the poll. While this is an illustrative embodiment, one of skill in the art would recognize that various combinations of requests/commits may work in a similar manner as described in FIG. 2.

Although not specially shown, the process of FIG. 2 typically works using a periodic polling process. For example, the polling process may occur every second. In addition, the polling period may be administered by a user. For example, the user may set the polling time to occur every two seconds.

In addition, the process of FIG. 2 assumes an initial setup process is executed. The very first time, all the records are synchronized (e.g., the LastModifiedTime, the RowID, and the TXID columns are added to the transaction database 103). This is called initial migration and in one embodiment is handled by CDC thread using a batch process.

The process begins in step 200 when the application 102 requests three transactions (transactions 1-3). A transaction could be to update a row/column, add a row/column, change a value, remove a row/column, etc. in the databases 120A-120N. While shown as a single transaction request, step 200 may comprise three separate requests. When the transaction requests of step 200 are received, the transaction database 103 assigns, in step 202, the first transaction request a transaction ID number 1 (TXID 1), the second transaction request a transaction ID number 2 (TXID 2), and the third transaction request a transaction identification number 3 (TXID 3). The transaction database 103, sets the LastModifiedTime (see Table 2) for transaction identifiers 1 and 3 to the current time based on receiving the transaction request for transactions 1 and 3 in step 202.

The application 102 sends a commit for transaction requests 1 and 3 in step 204. The commit of step 204 may comprise a single message or it may comprise two separate messages. The transaction database 103 receives the message(s) to commit transactions 1 and 3 in step 204. In response to receiving the commit message of step 204, the transaction database 103 commits the transactions to the transaction database 103 in step 206. The transaction database 103 also stores the TXID for transactions 1 and 3 in the transaction database 103 based on the commit in step 206. The transaction database 103 also keeps track of which transactions that have committed, but have not yet been synchronized with the database(s) 120A-120N (transactions 1 and 3 in this example) in step 206.

The transaction manager 104 polls (a time based poll), in step 208, the transaction database 103 for the committed transaction identifiers. In response to the poll of step 208, the transaction database 103 sends, in step 210, modified records of the committed transactions through which the transaction manager 104 infers the committed transactions are transactions 1 and 3 (TXIDs 1 and 3). Alternatively, the TXIDs 1 and 3 may be directly included along with the modified records of the committed transactions in step 210. In response to receiving the transaction identifiers 1 and 3 in step 210, the transaction manager 104, identifies any missing transaction identifiers based a contagious list of transaction identifiers in step 212. In this case, there is not a contagious list of transaction identifiers (1 and 3) and the transaction manager 104 identifies that transaction identifier 2 is missing. The transaction manager 104 stores, in step 212, the missing transaction identifier 2 in a list of missing transaction identifiers.

The transaction manager 104 also timestamps the missing transaction identifier 2 in step 212. The purpose of timestamping missing transaction identifiers is so that the timestamp can be used to identify a missing transaction that was never committed.

In one embodiment, the timestamp may be created by the transaction database 103 for each transaction identifier when the transaction identifiers are first created. The timestamp(s) are then sent to the transaction manager 104, which intern identifies if any of the transaction identifiers are missing transaction identifiers.

The transaction manager 104 then synchronizes, in step 214, the transactions 1 and 3 by sending a sync message to the database(s) 120A-120N (e.g., to database 120A). The sync message of step 214 includes the information necessary to complete the transactions 1 and 3. The sync message of step 214 may comprise two sync messages going to different databases 120A and 120N. Alternatively, the sync message of step 214 may only go to a single database 120 (e.g., database 120N). The databases 120A-120N then synchronize the data, in step 216, by making the necessary changes in the databases 120A-120N.

The contagious list of transaction identifiers is based on the continuous polling process. For example, assume transaction identifiers 10-11 were received in poll number 10. If in poll 11, transaction identifier 12 is received from the transaction database 103, there would be no missing transaction identifier(s) because there is a contagious list of numbers 10-12. If on poll 12, transaction identifier 15 was received, then there would be two missing transaction identifiers (transaction identifiers 13 and 14) because the list is not contagious 10-12 and 15).

The application 102 sends, in step 218, a commit for transaction 2. The transaction database 103 receives the commit for transaction 2 in step 218. In response to receiving the commit message of step 218, the transaction database 103 commits the transaction 2 to the transaction database 103 in step 220. The transaction database 103, sets the LastModifiedTime (see Table 2) of transaction identifier 2 to the current time based on when transaction 2 was committed in step 220. The transaction database 103 also stores the TXID for transaction 2 in the transaction database 103 based on the commit in step 218. The transaction database 103 keeps track of which transactions that have committed, but have not yet been synchronized with the database(s) 120A-120N (transaction 2 in this example) in step 220.

The transaction manager 104 polls (the same time based poll that occurred in step 208), in step 222, the transaction database 103 for the next set of modified records. In this example, there are no new modified records and the transaction database 103 responds by indicating that there are no new modified records in step 224. Based on the missing transaction identifier 2 that was identified in step 212, the transaction manager 104 sends, in step 226 a poll for any missing transaction identifiers (TXID 2 in this example). In response, the transaction database 103 sends, in step 228, modified records of the committed transaction 2 (TXID 2) to the transaction manager 104. In response to receiving the transaction identifier 2 in step 228, the transaction manager 104, identifies any missing transaction identifiers based a contagious list of transaction identifiers in step 230. In this case, there now is a contagious list of transaction identifiers (1-3) because transaction identifier 2 now makes the list contagious.

Since the transaction identifier 2 is in the list of missing transaction identifiers, the transaction manager 104 removes the transaction identifier 2 from the list of missing transaction identifiers in step 230. The transaction manager 104 then synchronizes, in step 232, transaction 2 by sending a sync message to the database(s) 120A-120N (e.g., to database 120A). The sync message of step 232 includes the information necessary to complete transaction 2. The databases 120A-120N then synchronize the data in step 234 by making the necessary changes in the databases 120A-120N.

As one of skill in the art would recognize, the polls of steps 222 and 226 may be combined into a single poll and the responses of steps 224 and 228 may also be combined into a single response. In this embodiment, steps 226 and 228 would not occur. Also, as one would recognize, step 226 may occur before step 224 depending on implementation.

The polling process for missing transaction identifiers described in step 226 will discontinue, in this example, because there are no more missing transaction identifiers in the list of missing transaction identifiers. If a new missing transaction identifier is later identified, the polling process for the identified missing transaction identifier(s) will then resume.

FIG. 3 is a flow diagram of a process for tracking transactions that were received, but not committed. In FIG. 3, steps 200-216 are the same as in FIG. 2. However, instead of receiving the commit of transaction 2 in step 218, the application 102 for some reason does not commit transaction 2 in step 300. For example, the application 102 may have crashed between the steps 204 and 218. Alternatively, the application 102 may decide to not go forward with the commit of step 218. In these examples, the commit of step 218 for transaction 2 never occurs.

Since there was no commit of transaction 2, transaction 2 was not synchronized to the databases 120A-120N as described in FIG. 2. However, as discussed previously the transaction manager 104 has stored the missing transaction identifier 2 in a list of missing transaction identifiers as described above in step 212; the missing transaction identifier 2 needs to be reconciled at some point. The process of FIG. 3 reconciles the missing transaction identifier 2 as described below.

In step 302, the application 102, the transaction database 103, the transaction manager 104, and the databases 120A-120N continue the polling process as described in FIG. 2 for synchronizing committed transactions using similar polls like described in steps 222 (time based poll) and 226 (missing transaction identifiers). The application 102 sends, in step 304, a transaction request for transaction N. The transaction database 103 receives the transaction request for transaction N in step 304. When the transaction request of step 304 is received, the transaction database 103 assigns, in step 306, the transaction request of step 304 a transaction identification number N (TXID N).

The application 102 sends a commit for transaction request N in step 308. The transaction database 103 receives the message to commit transaction N in step 308. In response to receiving the commit message of step 308, the transaction database 103 commits transaction N to the transaction database 103 in step 310. The transaction database 103, sets the LastModifiedTime (see Table 2) for transaction N to the current time based on when transaction N was committed in step 310. The transaction database 103 also stores the TXID for transaction N in the transaction database 103 based on the commit in step 310. The transaction database 103 keeps track of which transactions that have committed, but have not yet been synchronized with the database(s) 120A-120N in step 310.

The transaction manager 104 polls (the time based poll of step 208), in step 312, the transaction database 103 for contagious transaction identifiers. In response, the transaction database 103 sends, in step 314, modified records of the committed transaction N (TXID N) to the transaction manager 104. In response to receiving the transaction identifier N in step 314, the transaction manager 104, identifies any missing transaction identifiers based a contagious list of transaction identifiers in step 316. In this case, there is a contagious list of transaction identifiers (assuming that there were no missing transaction identifiers in the polling process of step 302).

In step 316, the transaction manager 104 polls the transaction database 103 for any missing transaction identifiers (TXID 2 in this example). In response, the transaction database 103 responds that transaction identifier 2 has not been committed in step 318. In this example, transaction identifier 2 is still in the list of missing transaction identifiers and has still not been committed. For each transaction identifier in the list of missing transaction identifiers, there is an associated timestamp (e.g., as described in step 212). The respective timestamp for each missing transaction identifier is compared to a threshold time (e.g., a 30 minute period administered by a user) to see if the missing transaction identifier is no longer valid because the transaction associated with the missing transaction identifier never committed. In this example, it is determined that missing transaction identifier 2 is no longer valid. For example, because the timestamp associated with the missing transaction identifier 2 was set more than 30 minutes ago (the threshold time), the missing timestamp 2 is removed from the list of missing transaction identifiers in step 320.

The transaction manager 104 then synchronizes, in step 322, transaction N by sending a sync message to one of the database(s) 120A-120N (e.g., database 120A). The database 120A then synchronize the data in step 324.

In the above example of FIG. 3, the polling process for missing transaction identifiers as described in step 316 will discontinue because there are no additional missing transaction identifiers in the list of transaction identifiers. The polling process for missing transaction identifiers will start up again when another missing transaction identifier(s) is identified.

Below is exemplary pseudocode of the exemplary polling process used by the transaction manager 104 as described above in FIGS. 2-3.

```
while (true)
{
  nap(1); sleep a second
  changedRecords=getChangedRecordsUsingTimestamp-
Query(lastPollTime);
  missingTransactions=detectMissingTransactions(change-
dRecords,lastSyncedTransaction);
  cumulativeMissingTransactions=addToDetectedTrans-
actions(missingTransactions);
  changedRecords=getChangedRecordsUsingTransaction-
Query(cumulativeMissingTransactions);
  garbageCollectMissingTransactions(cumulativeMiss-
ingTransactions);
}
```

The pseudocode uses a 1 second sleep thread to activate (nap(1)). It then gets the changed records (changedRecords=getChangedRecordsUsingTimestamp-Query(lastPollTime), i.e., the TXIDs in step 210). A function is then called to get the missing transaction identifiers (missingTransactions=detectMissingTransactions(change-dRecords,lastSyncedTransaction, i.e., step 212). The missing transaction identifiers are then added to the list of missing transaction identifiers (cumulativeMissing-Transactions=addToDetectedTransactions(missingTransactions, i.e., step 212). The transaction manager 104 then syncs the transactions (changedRecords=getChangedRecords-UsingTransactionQuery(cumulativeMissingTransactions, step 214). The process then calls a garbage collection routine to remove any missing transactions that have taken too long (garbageCollectMissingTransactions(cumulativeMiss-ingTransactions), as described in step 316).

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:

initiate a poll of a first database, wherein the poll of the first database is to identify if any transactions have occurred since a previous poll;

receive information, based on the poll of the first database, wherein the received information identifies one or more transaction identifiers;

identify a missing transaction identifier based on a contagious list of transaction identifiers, wherein the contagious list of transaction identifiers includes a numerically ordered list of transaction identifiers;

in response to identifying the missing transaction identifier, storing the missing transaction identifier in a list of missing transaction identifiers for use in a later poll of the first database; and determine, based on a defined time period, that a transaction associated with the missing transaction identifier was not committed, wherein determining that the transaction associated with the missing transaction identifier was not committed is based on a timestamp that is created when the missing transaction identifier is first identified.

2. The system of claim 1, wherein the microprocessor readable and executable instructions further cause the microprocessor to:

determine if the missing transaction identifier is identified in the later poll of the first database; and in response to determining that the missing transaction identifier is identified in the later poll of the first database, removing the missing transaction identifier from the list of missing transaction identifiers.

3. The system of claim 2, wherein the later poll is one of:
a separate poll specifically for the missing transaction identifier; or
a poll that is for both new changed records and the missing transaction identifier.

4. The system of claim 1, wherein the microprocessor readable and executable instructions further cause the microprocessor to in response to determining that the transaction associated with the missing transaction identifier was not committed, remove the missing transaction identifier from the list of missing transaction identifiers.

5. The system of claim 1, wherein the microprocessor readable and executable instructions further cause the microprocessor to:

add a column to a database table of the first database to track the one or more transaction identifiers.

6. The system of claim 1, wherein the one or more transaction identifiers identified in the received information are for one or more committed transactions.

7. The system of claim 1, wherein the missing transaction identifier is for a transaction that has been received, but not committed.

8. A method, comprising:

initiating, by a microprocessor, a poll of a first database, wherein the poll of the first database is to identify if any transactions have occurred since a previous poll;

receiving information, by the microprocessor, based on the poll of the first database, wherein the received information identifies one or more transaction identifiers;

identifying, by the microprocessor, a missing transaction identifier based on a contagious list of transaction identifiers, wherein the contagious list of transaction identifiers includes a numerically ordered list of transaction identifiers;

in response to identifying the missing transaction identifier, storing, by the microprocessor, the missing transaction identifier in a list of missing transaction identifiers for use in a later poll of the first database; and determining, based on a defined time period, that a transaction associated with the missing transaction identifier was not committed, wherein determining that the transaction associated with the missing transaction identifier was not committed is based on a timestamp that is created when the missing transaction identifier is first identified.

9. The method of claim 8, further comprising:

determining if the missing transaction identifier is identified in the later poll of the first database; and in response to determining that the missing transaction identifier is identified in the later poll of the first database, removing the missing transaction identifier from the list of missing transaction identifiers.

10. The method of claim 9, wherein later poll is one of:
a separate poll specifically for the missing transaction identifier; or
a poll that is for both new changed records and the missing transaction identifier.

11. The method of claim 8, further comprising in response to determining that the transaction associated with the missing transaction identifier was not committed, removing the missing transaction identifier from the list of missing transaction identifiers.

12. The method of claim 8, further comprising:

adding a column to a database table of the first database to track the one or more transaction identifiers.

13. The method of claim 8, wherein the one or more transaction identifiers identified in the received information are for one or more committed transactions.

14. The method of claim 8, wherein the missing transaction identifier is for a transaction that has been received, but not committed.

15. A non-transient computer readable medium having stored thereon instructions that cause a microprocessor to execute a method, the method comprising instructions to:

initiate a poll of a first database, wherein the poll of the first database is to identify if any transactions have occurred since a previous poll;

receive information, based on the poll of the first database, wherein the received information identifies one or more transaction identifiers;

identify a missing transaction identifier based on a contagious list of transaction identifiers, wherein the contagious list of transaction identifiers includes a numerically ordered list of transaction identifiers;

in response to identifying the missing transaction identifier, storing the missing transaction identifier in a list of missing transaction identifiers for use in a later poll of the first database; and determine, based on a defined time period, that a transaction associated with the missing transaction identifier was not committed, wherein determining that the transaction associated with the missing transaction identifier was not committed is based on a timestamp that is created when the missing transaction identifier is first identified.

16. The non-transient computer readable medium of claim 15, wherein the instructions further cause the microprocessor to:
  determine if the missing transaction identifier is identified in the later poll of the first database; and
  in response to determining that the missing transaction identifier is identified in the later poll of the first database, removing the missing transaction identifier from the list of missing transaction identifiers.

17. The non-transient computer readable medium of claim 16, wherein the later poll is one of:
  a separate poll specifically for the missing transaction identifier; or
  a poll that is for both new changed records and the missing transaction identifier.

18. The non-transient computer readable medium of claim 15, wherein the instructions further cause the microprocessor to
  in response to determining that the transaction associated with the missing transaction identifier was not committed, remove the missing transaction identifier from the list of missing transaction identifiers.

19. The system of claim 1, wherein the first database is a source of truth database.

20. The method of claim 8, wherein the first database is a source of truth database.

\* \* \* \* \*